(No Model.)
F. CUNTZ.
FLUSH TANK.
No. 373,885. Patented Nov. 29, 1887.
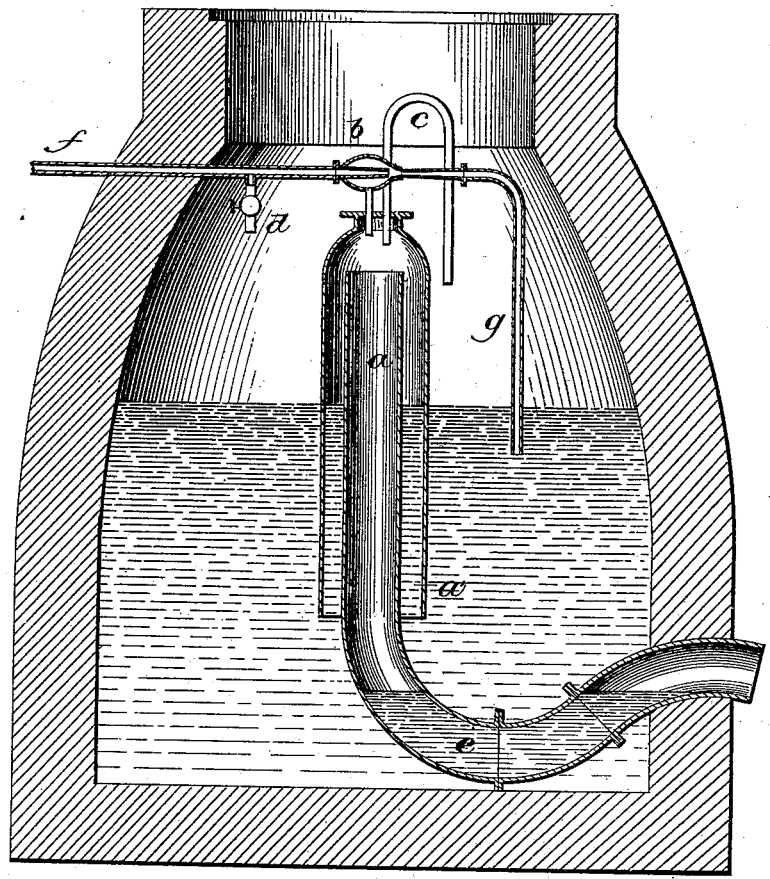
Witnesses:
Chas A. Heff
Jere. Sullivan.
Inventor:
Friedrich Cuntz

UNITED STATES PATENT OFFICE.

FRIEDRICH CUNTZ, OF CARLSBAD, BOHEMIA, AUSTRIA-HUNGARY, ASSIGNOR TO THE DRAINAGE CONSTRUCTION COMPANY, OF BOSTON, MASSACHUSETTS.

FLUSH-TANK.

SPECIFICATION forming part of Letters Patent No. 373,885, dated November 29, 1887.

Application filed February 14, 1887. Serial No. 227,646. (No model.) Patented in England March 22, 1884, No. 8,091; in Germany July 14, 1884, No. 27,959, and in Austria-Hungary December 6, 1884, No. 2,471 and No. 2,428.

*To all whom it may concern:*

Be it known that I, FRIEDRICH CUNTZ, of Carlsbad, Bohemia, Austria-Hungary, have invented a new and useful Improvement in Flush-Tanks, (for which patents have been taken out in England, No. 8,091, of March 22, 1884; in Germany, No. 27,959, of July 14, 1884, and in Austria-Hungary, No. 2,471 and No. 2,428, December 6, 1884;) and I hereby declare that the following is a full, clear, and exact description of the same, reference being had to the drawings, forming part of this specification.

My invention relates to an improvement in flush-tanks for flushing sewers.

The apparatus consists of a reservoir or tank fed by a continuous small stream from the water-supply, which is rapidly emptied by an automatic siphon when the water-level in the tank reaches a certain height.

The discharging apparatus consists of a siphon brought into action when the tank is full to or nearly to the overflow-point by the rarefaction of its contained air, the rarefaction being effected by an air-pump or aspirator worked by the entering stream of water. The air-pump most conveniently used works on the principle of the jet-pump or injector.

The better to illustrate my invention, reference is made to the accompanying drawing, in which the form of siphon illustrated is the annular siphon. The same principle may be applied to a bent siphon.

$a$ is the discharging-limb, and $a'$ is its receiving-limb. The water is delivered from the water-supply through the pipe $f$, which, after entering the tank, may or may not have a stop-cock, $d$, for the more rapid filling of the tank. In the course of the pipe there is placed a jet-pump or other similar apparatus, as shown at $b$. In the arrangement shown the water escaping through the nozzle at the end of the pipe $f$, which is inclosed within the pump-chamber, is driven into the exhaust-pipe $g$ and escapes into the tank. The suction-pipe of the air-pump opens into the upper part of the siphon. The water passing from the nozzle into the exhaust-pipe carries air with it. This air is replaced by air drawn from the interior of the siphon. After the water in the tank has risen to close the mouth of the receiving-limb $a'$, then, the discharging-limb being trapped, as shown at $e$, the air in the siphon is cut off from the air of the tank.

In my invention communication is established between the air in the tank and the air in the siphon by the pipe $c$, so placed that until the tank is filled to or nearly to the overflow-point it remains open, one of its ends becoming closed by sealing when the water rises a little higher.

Having described my invention with reference to the drawing, I now describe its mode of operation. The tank being partly filled, as shown, and water flowing into it through the pipe $f$ and delivered by its nozzle into the exhaust-pipe $g$ of the air-pump $b$, air is withdrawn from the siphon, being replaced by the air of the tank passing through the pipe $c$. As the tank fills, its water will rise until it seals one end of the pipe $c$, thus cutting off the supply of air to the siphon. From this moment the further withdrawal of air from the siphon tends to its rarefaction and causes it to fill with water until its siphonic action takes place. The tank having been emptied down to the mouth of the receiving-limb $a$, and air being there admitted, the siphonic action ceases. The water still retained in the siphon, partly filling it, is allowed to escape slowly by the admission of air through the pipe $c$, which is again open from the tank to the siphon. The pipe $c$ is a very small one, and the amount of air admitted through it during the operation of the siphon is not sufficient to interfere with its effective action.

The siphon would work without the air-pipe $c$. This, however, essentially increases the certainty of the operation. In practice the size of the air-pipe is so regulated that during the full working of the siphon it will not admit sufficient air to prevent its practical operation.

The essential elements of the apparatus are the air-pump, the sealing of both ends of the siphon, and the air-pipe $c$, so arranged as to maintain a communication between the air of the tank and that of the siphon until the water in the reservoir reaches a certain height, when it is sealed and the airway is closed. Another characteristic feature of the apparatus is that the force of the feeding stream of water is used to work the air-pump, while the water itself, after performing this duty, goes to fill the tank for the next discharge. The removal of air from the siphon may be effected by any form of air-pump driven by such a stream as can be admitted to such a tank. Of known air-pumps, however, the one shown offers the simplest means of reaching the end in view.

My invention may be described as an automatic intermittent siphon worked by the withdrawal of its contained air by an exhaust operated by the feeding stream, the same being used for the periodic flushing of sewers and drains.

Having thus described my invention, I claim as new and desire to secure by Letters Patent—

1. The combination, with a siphon used to discharge a flush-tank, of an air-pump or aspirator operated by the feeding stream, its exhaust opening into the interior of the siphon.

2. In combination with a siphon, the air-pump $b$ and the pipe $c$, so arranged as to maintain communication between the siphon and the outer air until one end of the same is closed by the rising of the water-level, as and for the purpose described.

3. The combination, with the top of a siphon, of a pipe the end of which is provided with a T-connection, an inlet-pipe, the end of which is within said T-connection, the orifice of said inlet-pipe being smaller than the diameter of the lower part of the T-connection, and a trap at the bottom of the siphon, as shown and described.

Berlin, January 21, 1887.

FRIEDRICH CUNTZ.

Witnesses:
 B. ROI.
 M. W. MOORE.